(12) United States Patent
Shenoy

(10) Patent No.: US 11,830,200 B2
(45) Date of Patent: Nov. 28, 2023

(54) AMBIENT TEMPERATURE REPORTING THROUGH INFRARED FACIAL RECOGNITION

(71) Applicant: ADVANCED MICRO DEVICES, INC., Santa Clara, CA (US)

(72) Inventor: Sukesh Shenoy, Austin, TX (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 83 days.

(21) Appl. No.: 15/598,852

(22) Filed: May 18, 2017

(65) Prior Publication Data

US 2018/0336398 A1 Nov. 22, 2018

(51) Int. Cl.
| | |
|---|---|
| G06T 7/194 | (2017.01) |
| G06F 1/20 | (2006.01) |
| G06F 1/3206 | (2019.01) |
| G06V 40/16 | (2022.01) |
| G06V 10/143 | (2022.01) |
| G06T 7/90 | (2017.01) |
| G06F 1/3296 | (2019.01) |
| G06F 1/324 | (2019.01) |

(52) U.S. Cl.
CPC .............. *G06T 7/194* (2017.01); *G06F 1/206* (2013.01); *G06F 1/3206* (2013.01); *G06T 7/90* (2017.01); *G06V 10/143* (2022.01); *G06V 40/166* (2022.01); *G06V 40/172* (2022.01); *G06F 1/324* (2013.01); *G06F 1/3296* (2013.01); *G06T 2207/10004* (2013.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 4,587,563 A | * | 5/1986 | Bendell ................. | H04N 5/361 348/244 |
| 8,611,586 B1 | * | 12/2013 | Brodeur ............... | G06V 10/255 382/168 |
| 8,909,384 B1 | * | 12/2014 | Beitelmal ............... | G06F 1/206 700/300 |

(Continued)

FOREIGN PATENT DOCUMENTS

WO WO-2017073344 A1 * 5/2017 ............. B60R 21/00

OTHER PUBLICATIONS

Grimes, Ronan, Ed Walsh, and Pat Walsh. "Active cooling of a mobile phone handset." Applied Thermal Engineering 30.16 (2010): 2363-2369 (Year: 2010).*

(Continued)

*Primary Examiner* — Emily C Terrell
*Assistant Examiner* — Nathan J Bloom

(57) ABSTRACT

Various methods an apparatus to use facial recognition in a computing device are disclosed. In one aspect, a method of controlling a component of a computing device is provided. The method includes taking an IR image of a user and a background with an IR sensor of a computing device. The computing device is in a location. The IR image is segmented into user image data and background image data. An ambient temperature of the location is determined using the background image data. An aspect of the component is controlled based on the ambient temperature.

20 Claims, 7 Drawing Sheets

(56) References Cited

U.S. PATENT DOCUMENTS

| | | | | |
|---|---|---|---|---|
| 9,886,640 | B1* | 2/2018 | Chen | G06K 9/00906 |
| 2004/0124802 | A1* | 7/2004 | Brogardh | B25J 9/1664 |
| | | | | 318/568.22 |
| 2005/0205785 | A1* | 9/2005 | Hornback | G01J 5/22 |
| | | | | 250/332 |
| 2005/0259849 | A1* | 11/2005 | Pavlidis | A61B 5/015 |
| | | | | 382/118 |
| 2007/0156370 | A1* | 7/2007 | White | G06F 1/324 |
| | | | | 702/132 |
| 2008/0179520 | A1* | 7/2008 | Kauffman | G02B 23/12 |
| | | | | 250/332 |
| 2011/0034176 | A1* | 2/2011 | Lord | G06F 17/30244 |
| | | | | 455/450 |
| 2011/0143811 | A1* | 6/2011 | Rodriguez | G06K 9/00986 |
| | | | | 455/556.1 |
| 2011/0199053 | A1* | 8/2011 | Minamiura | H01M 10/482 |
| | | | | 320/136 |
| 2012/0182427 | A1 | 7/2012 | Marshall | |
| 2013/0110311 | A1* | 5/2013 | Ver Steeg | G01N 21/27 |
| | | | | 701/1 |
| 2013/0289792 | A1* | 10/2013 | Cheng | G05D 23/1919 |
| | | | | 700/300 |
| 2014/0080428 | A1* | 3/2014 | Rhoads | H04W 4/70 |
| | | | | 455/88 |
| 2014/0195066 | A1* | 7/2014 | Nanda | G06F 1/203 |
| | | | | 700/300 |
| 2016/0029896 | A1 | 2/2016 | Lee et al. | |
| 2016/0048363 | A1 | 2/2016 | North et al. | |
| 2016/0086021 | A1 | 3/2016 | Grohman et al. | |
| 2016/0113517 | A1 | 4/2016 | Lee et al. | |
| 2016/0253551 | A1 | 9/2016 | Pezzaniti et al. | |
| 2017/0095157 | A1* | 4/2017 | Tzvieli | A61B 5/0077 |
| 2017/0138628 | A1* | 5/2017 | Sondur | H05K 7/20836 |
| 2017/0138788 | A1* | 5/2017 | Nazemi | G01J 1/4228 |
| 2017/0322086 | A1* | 11/2017 | Luharuka | G01J 5/48 |
| 2018/0061056 | A1* | 3/2018 | Zhao | G06T 7/0051 |
| 2018/0240251 | A1* | 8/2018 | Kitagawa | B60R 21/00 |
| 2019/0212792 | A1* | 7/2019 | Bailey | G06F 1/1626 |

OTHER PUBLICATIONS

Christopher K. Eveland et al.; *Tracking Human Faces in Infrared Video*; Proceedings IEEE Workshop; 2001; pp. 1-11.

I. Pavlidis; et al.; *Biometrics: Face Recognition in Thermal Infrared*; Medical Systems and Devices; Chapter 29; 2006; pp. 1-16.

Gil Friedrich et al.; *Seeing People in the Dark: Face Recognition in Infrared Images*; 2nd BMCV, Tubingen; 2003; pp. 1-13.

Sam Chang; *How to Implement Face Authentication in Windows 10*; Microsoft; 2015; pp. 1-32.

* cited by examiner

AMBIENT TEMPERATURE REPORTING THROUGH INFRARED FACIAL RECOGNITION

BACKGROUND OF THE INVENTION

Facial recognition is conventionally used for device authentication and other purposes. Some conventional facial recognition systems use visible light to image a user's face and background. However, shadows, facial hair, facial orientation relative to the camera and other factors can affect the accuracy of such systems.

Infrared (IR) facial recognition is not as sensitive to shadows, facial hair the other factors that cause difficulties for visible light sensing. Conventional IR facial recognition uses the unique heat-signature of the face for recognition. Current facial recognition implementations use an IR camera to take an IR image of a user and whatever background is present. Next, conventional IR facial recognition systems process calibrated IR images to segment the face from the background. This segmentation is conventionally performed using various statistical methods.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
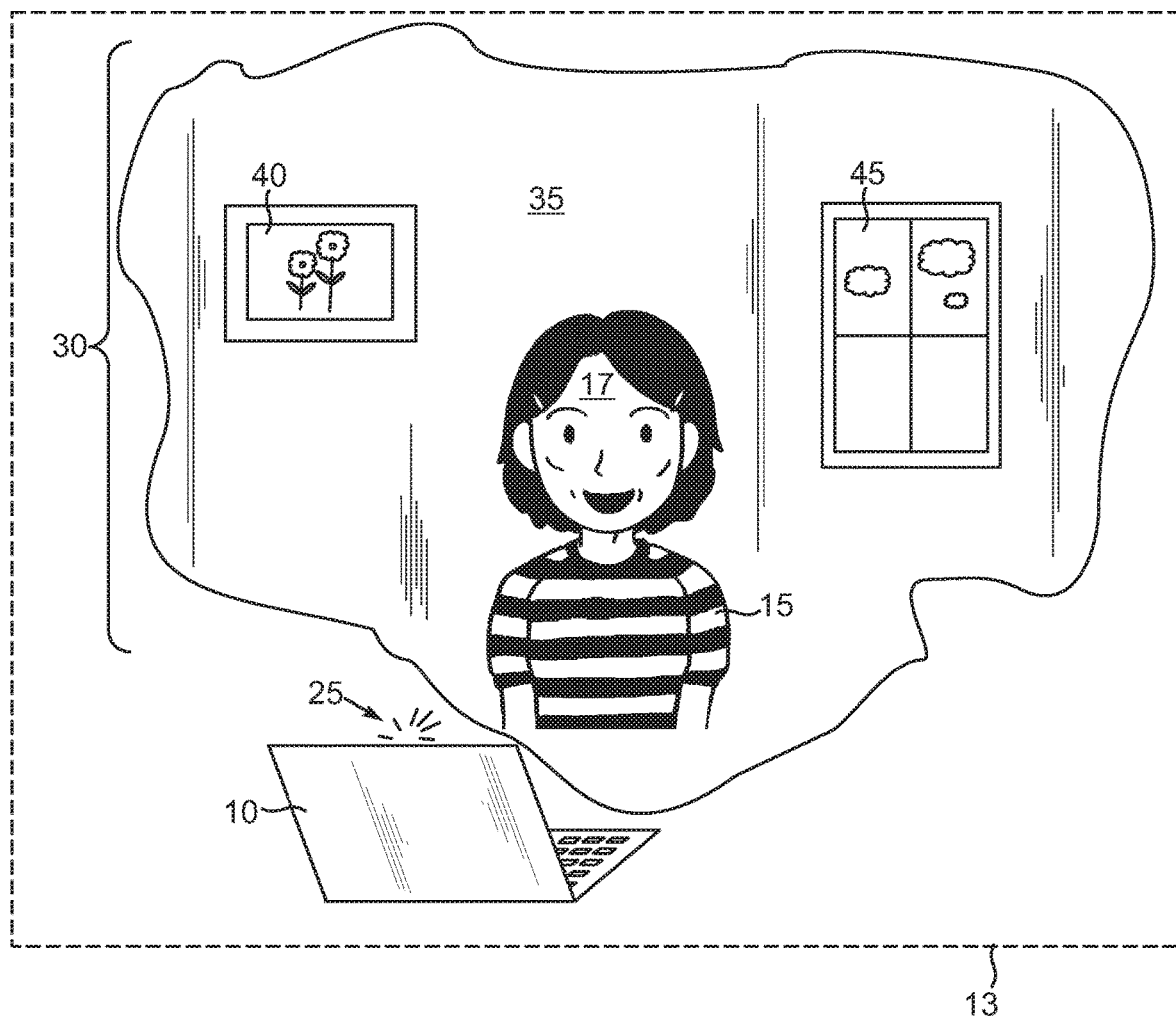
FIG. 1 is a pictorial view of an exemplary computing device with facial recognition capability.

Current facial recognition implementations use an IR camera to take an IR image of a user and whatever background is present. Next, conventional facial recognition software segment the facial data from the background data. This segmentation is conventionally performed using various statistical methods. The background IR data is then discarded in favor of relevant facial recognition information. However, this ambient IR provides ambient temperature information that can be used by computing devices, such as laptop computers, tablet computers, game consoles, desktop computers and more. Current computing devices are designed to optimize performance and meet acoustics and skin temperature requirements based on an assumed ambient temperature. An assumed ambient temperature can lead to performance being left on the table and can cause acoustics and skin temperature issues. But real time measured ambient temperature information, say from the conventionally discarded background IR data, can be used by the computing device to optimize performance and ergonomics (such as fan acoustics and skin temperatures).

In accordance with one aspect of the present invention, a method of computing is provided. The method includes taking an IR image of a user and a background with an IR sensor of a computing device. The computing device is in a location. The IR image is segmented into user image data and background image data. An ambient temperature of the location is determined using the background image data.

In accordance with another aspect of the present invention, a method of controlling a component of a computing device is provided. The method includes taking an IR image of a user and a background with an IR sensor of a computing device. The computing device is in a location. The IR image is segmented into user image data and background image data. An ambient temperature of the location is determined using the background image data. An aspect of the component is controlled based on the ambient temperature.

In accordance with another aspect of the present invention, a computing device is provided that includes an IR sensor configured to take an IR image of a user and a background while the computing device is in a location. The computing device also includes a processor programmed to segmenting the IR image into user image data and background image data and determine an ambient temperature of the location using the background image data.

In the drawings described below, reference numerals are generally repeated where identical elements appear in more than one figure. Attention is now turned to the drawings, and in particular to FIGS. 1 and 2, which are pictorial views of an exemplary computing device 10 in a location 13. The location 13 may be a room, a building or virtually any location. The computing device 10 includes hardware and software to enable machine-based recognition of a user 15, and more particularly facial recognition of the face 17 of the user 15, for a variety of purposes to be described in more detail below. The computing device 10 is shown facing toward the user 15 in FIG. 1 and in the opposite orientation in FIG. 2. To facilitate facial recognition, the computing device 10 includes an IR sensor 20, (not visible in FIG. 1) to sense IR radiation 25 emanating from the user 15 and whatever background 30 is behind the user 15. The computing device 10 may be a notebook computer, a tablet computer, a smart phone, a general purpose computer, a game console, a digital television, a handheld mobile device, a server, a memory device, an add-in board such as a graphics card, or any other computing device employing facial recognition by IR sensing. A field of view presented to the computing device 10, and in particular the IR sensor 20, consists of the user 15 and the background 30. Of course, the background 30 can take nearly infinite variations. However, in this illustration, the background 30 consists of a wall 35, a decorative photograph 40 and a window 45. The computing device 10 includes facial recognition software, which is operable to both perform facial recognition on the user 15 as well as perhaps presenting a log-in or authentication screen 47 as shown in FIG. 2.

Figure 3:
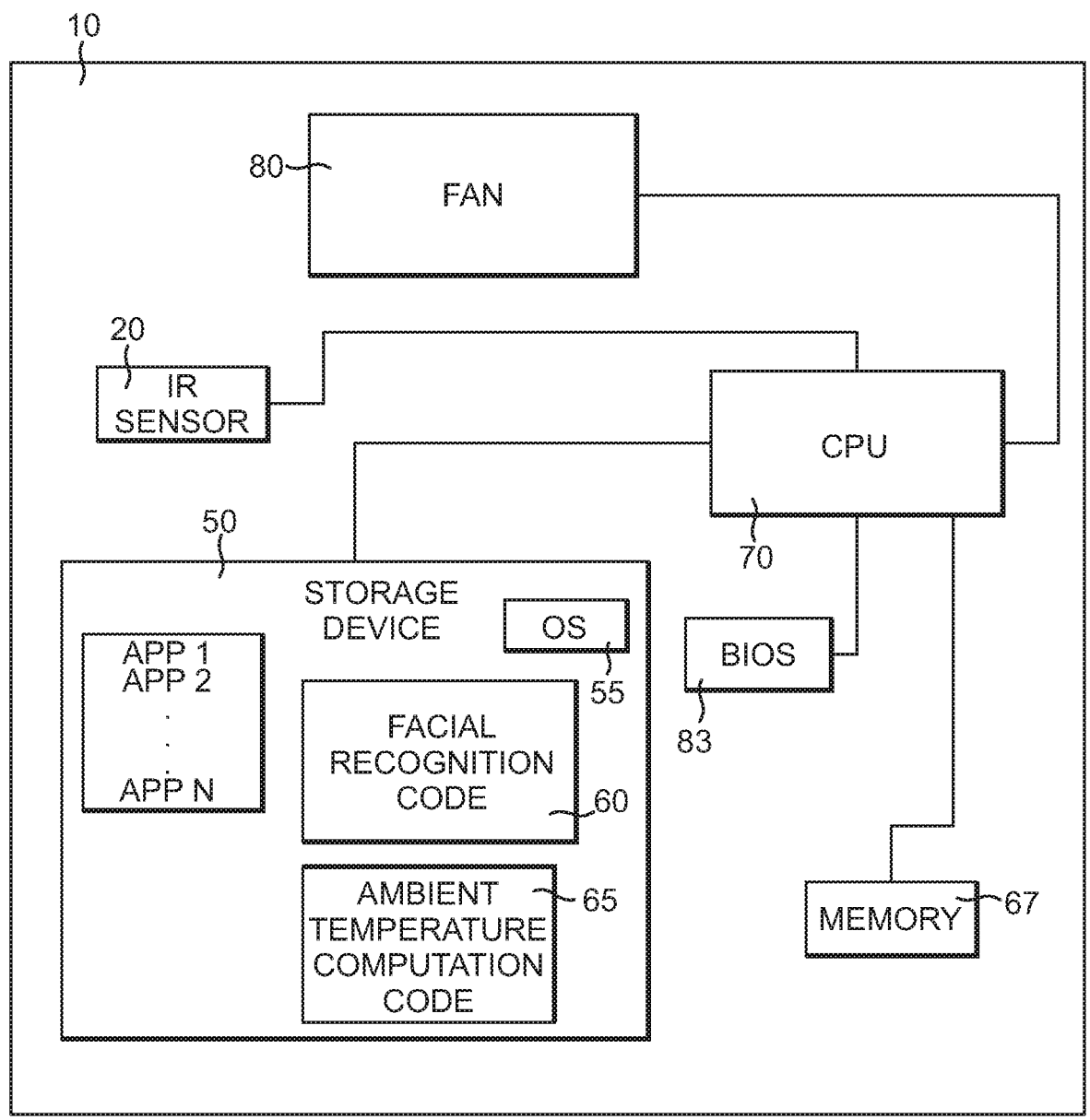
FIG. 3 is a block diagram of the exemplary computing device.

A more detailed description of an exemplary hardware/software architecture for the computing device 10 may be understood by referring now to FIG. 3, which is a block diagram. As noted above, the computing device 10 includes the IR sensor 20. The IR sensor 20 can be sensitive to IR and/or near IR wavelengths and be capable of taking still images and/or video frames. In addition, the computing device 10 includes a storage device 50, which can be a non-volatile computer readable medium and can be any kind of hard disk, optical storage disk, solid state storage device, ROM, RAM or virtually any other system for storing computer readable media. The storage device 50 is operable to store non-transient computer readable instructions for performing various functions disclosed herein.

The computing device 10 can include plural applications, which are abbreviated APP 1, APP 2 . . . APP N, and which can be drivers, software applications, or other types of applications. In addition, the computing device 10 can include an operating system 55, facial recognition code 60 and ambient temperature computation code 65. The operating system 55 and the applications APP 1, APP 2 . . . APP n can be stored on the storage device 50 and selectively loaded into system memory 67. System memory 67 can be RAM, ROM, flash combinations of these or other types of memory. Windows®, Linux, or more application specific types of operating system software can be used or the like. The ambient temperature computation code 60 includes instructions that enable the computing device 10 to use the data obtained by the IR sensor 25 to calculate a temperature of the background 30 and use that temperature as an Ambient Temperature for various purposes for the computing device 10, such as thermal management, power management, etc. to be described in more detail below. Various levels of integration can be achieved. For example, the facial recognition code 60 and the ambient temperature computation code 65 may be discrete blocks of code or one or more of each of these may be integrated into the operating system 55 as desired.

The computing device 10 can include a processor 70, which is programmed with instructions for performing the various operations disclosed herein. The processor 70 can be a microprocessor, a graphics processing unit, an accelerated processing unit that combines aspects of both or an application integrated specific circuit or other. The processor 70 is electronically connected to the IR sensor 25, the storage device 50, the memory 67 and one or more cooling fans, one of which is depicted and labeled 80. The processor 70 can incorporate functionality of an embedded controller to be described below.

A system basic input/output system (BIOS) 83 is provided and operatively coupled to the processor 70 and other components of the computing system 10. The BIOS 83 is preferably implemented as instructions and data in non-volatile memory. In addition to providing power on start up capabilities, the BIOS 83 facilitates communications between the OS 55, the processor 70 and other components.

Figure 4:
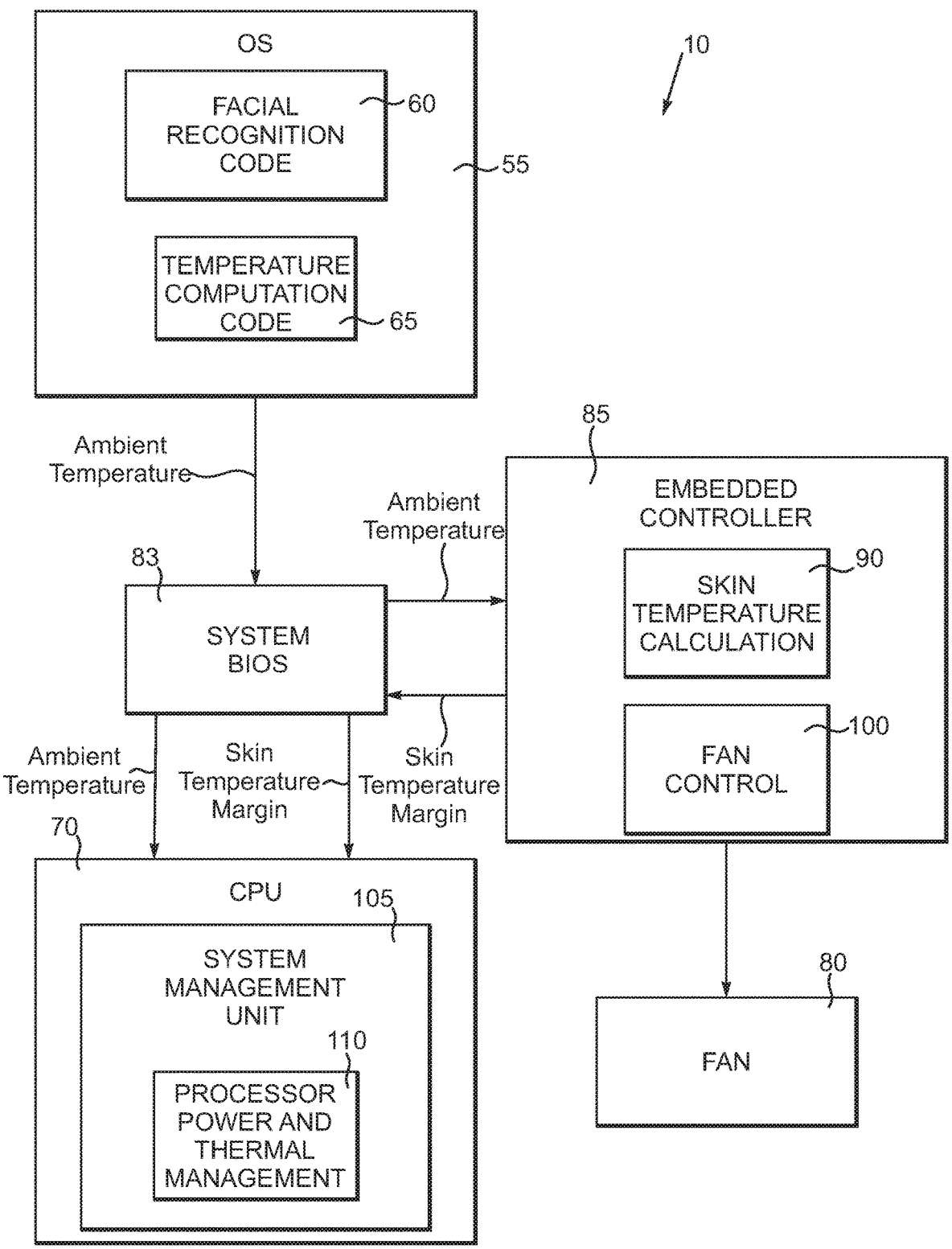
FIG. 4 is a block diagram depicting exemplary architecture for calculating ambient temperature and using that ambient temperature.

Additional details of an exemplary software/hardware architecture for the computing device 10 may be understood by referring now also to FIG. 4. As noted above, various levels of integration can be implemented. In this regard, the aforementioned ambient temperature computation code 60 and the facial recognition code 65 can be incorporated into the operating system 55. The computing device 10 can include an embedded controller 85 that performs a variety of functions. The embedded controller 85 can, in-turn, include skin temperature calculation logic 90 and fan control logic 100. The operating system 55 is operable to communicate with the embedded controller 85 and with the processor 70 by way of the system BIOS 83. The embedded controller 85 may be an integrated circuit or one or more integrated circuits that provide various functionalities, and the functionality thereof can be incorporated into the processor 70. The skin temperature calculation logic 90 is configured to include one or more temperature sensors to sense the temperature of either the embedded controller 85 or the processor 70 or both, and from these sensed temperatures determine a corresponding external temperature of the computing device 10. This external temperature of the computing device 10 may or may not affect the comfort of the user 15 shown in FIG. 1 if the computing device 10 is seated on the lap of or otherwise in contact with the skin of the user 15. The fan control logic 100 is designed to control the operation of the fan 80 using various types of inputs to be described in more detail below. The processor 70 includes a system management unit 105, which is designed to manage various aspects of the processor 70 and other components of the computing device 10. The system management unit 105 further includes processor power and thermal management logic 110, which is designed to provide power and thermal management for the processor 70.

Some exemplary information generation and flow will now be described in conjunction with FIG. 4. The OS 55 by way of the facial recognition code 60 and the ambient temperature computation code 65 is operable to not only provide facial recognition for authentication purposes but also to take some of the data obtained during the facial recognition process and, by way of the temperature computation code 65, determine an Ambient Temperature, which is communicated to the system BIOS 83. The system BIOS 83, in turn, provides the computed Ambient Temperature to the processor 70, and thus in turn to the system management unit 105 and the processor power and thermal management logic 110. In addition, the system BIOS 83 provides the Ambient Temperature to the embedded controller 85 and thus the skin temperature calculation logic 90 and the fan control logic 100. The skin temperature calculation logic 95 is configured to take the ambient temperature and calculate a Skin Temperature Margin, which is the difference between a preselected maximum allowable computing device external temperature and the current computing device external temperature. The maximum allowable computing device external temperature is selected to ensure that user skin contact with the computing device 10 is not uncomfortable. The fan control logic 100 is configured to take the ambient temperature and control the operation of the fan 80 appropriately. If the Ambient Temperature is lower than some threshold then the fan 80 can be run at lower RPMs or intermittently and thus provide a better acoustic experience for users, whereas if the Ambient Temperature is above some selected threshold then the fan 80 will have to be run more aggressively. The skin temperature calculation logic 95, by way of the embedded controller 85, reports the Skin Temperature Margin back to the BIOS 83. The BIOS 83 then transmits that Skin Temperature Margin to the processor 70. With the Ambient Temperature and Skin Temperature Margin inputs, the processor 70, and in particular the processor power and thermal management logic 110, can manage the operation of the processor 70. For example, if the processor power and thermal management logic 110 determines that the Ambient Temperature is above a certain threshold and/or the skin temperature margin is below a desired value or range then the processor power and thermal management logic 110 can take remedial steps, such as lowering the clocking or core voltage operation for the processor 70 and vice versa if the ambient temperature is lower than some threshold or the skin temperature margin is above a selected range. The processor 70 can also use its own measured temperature and calculated temperature and/or other inputs for managing its operation.

Figure 2:
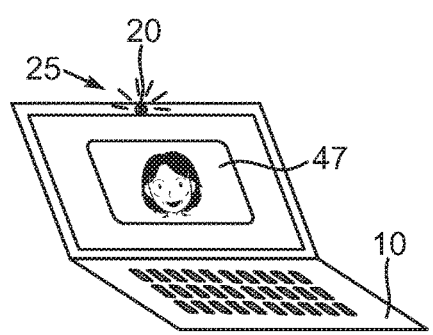
FIG. 2 is another pictorial view of an exemplary computing device with facial recognition capability.
Figure 5:
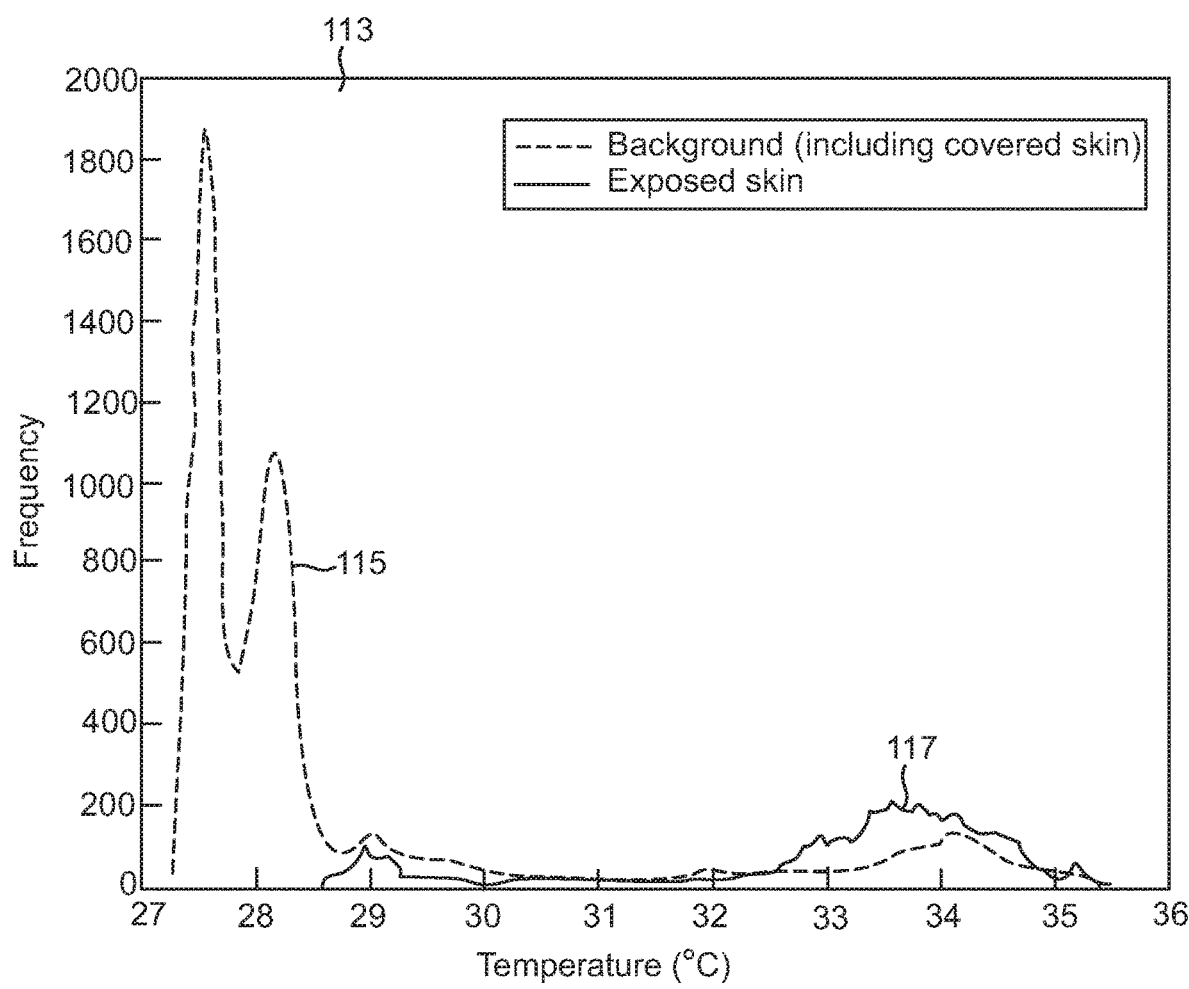
FIG. 5 is a graphical depiction of a conventional modeling of user skin and background IR temperature signatures.

An important phase in the disclosed face recognition and Ambient Temperature determination processes involves segmentation of the user face 17 from the background 30 depicted in FIG. 1. It has been observed that the typical distribution of temperatures associated with faces is quite different from the typical distribution of the background temperatures. These temperature distribution differences are depicted graphically in FIG. 5. As illustrated in FIG. 5, previous modeling of skin temperature, plot 115 shows that modeled skin temperature is bimodal. Previous modeling of background temperature, plot 117, has shown that background temperature, (which includes portions of skin covered by clothing) is also bimodal. For subjects in climate controlled rooms a typical temperature range for the dominant skin mode (plot 115) is ~32 to 35° C., while for the secondary mode it is ~28 to 30° C. The latter may overlap with the background distribution since areas of the face like the nose and ears have temperatures similar to the environment. For background temperature (plot 117) the dominant mode is in the lower band of the values (typically, in the range ~27 to 29° C.). The secondary background mode has its mean somewhere between the two modes of the skin distribution and a variance large enough to cover almost the entire band. Therefore, the secondary background distribution includes some relatively high temperature values. These are due to the fact that light clothes offer spots of high temperature (e.g., places where the clothes touch the skin), which mimic the skin distribution but are not skin.

Figure 6:
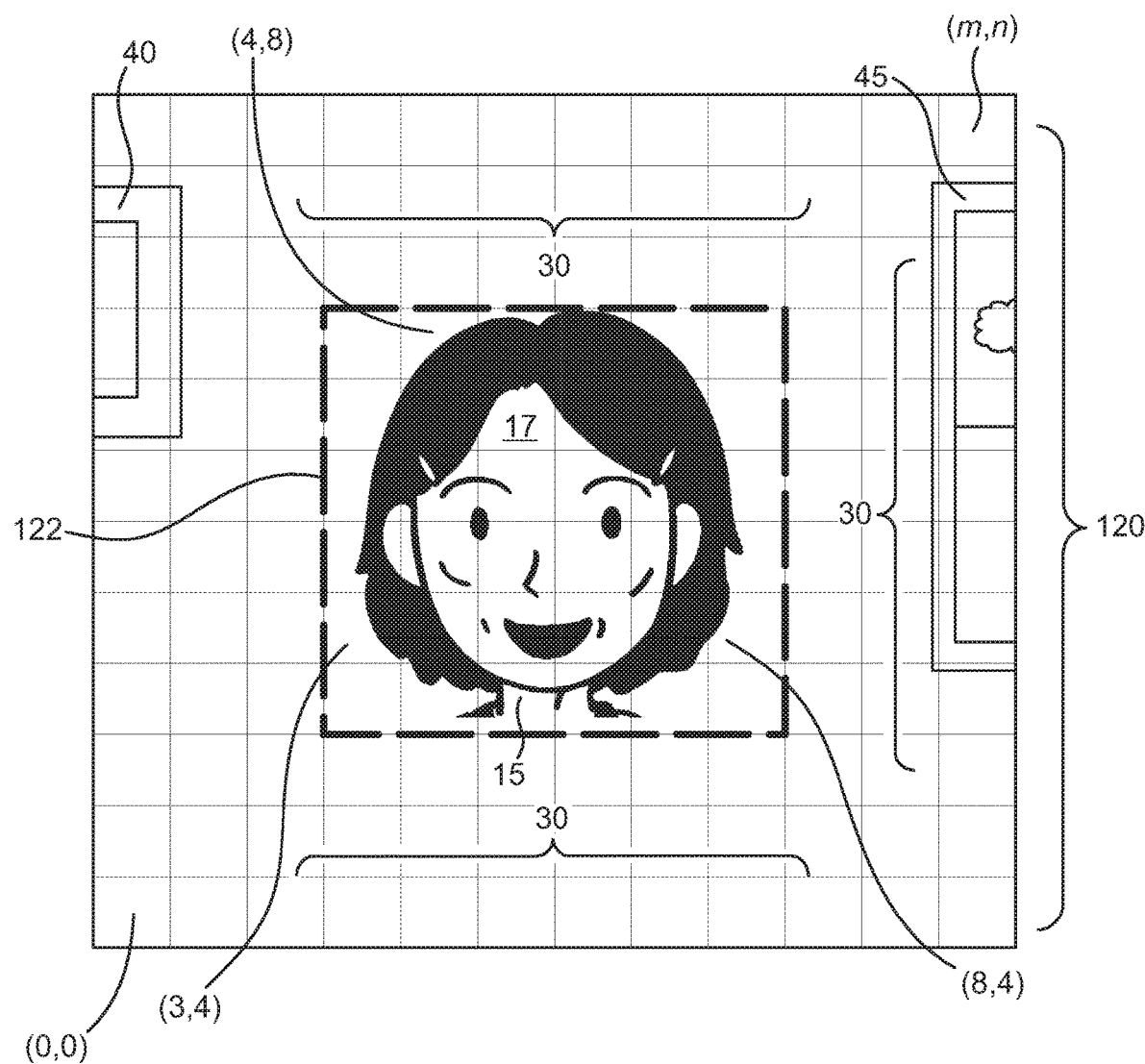
FIG. 6 is a depiction of an exemplary IR data frame.

Exemplary acquisition of IR data and calculation of Ambient Temperature therefrom may be understood by referring now to FIGS. 1, 2, 6 and 7. FIG. 6 depicts an exemplary frame 120 of IR data obtained of the user 15 and elements of the background 30 by way of the IR sensor 20. The IR data frame 120 can be obtained by the IR sensor 20 as a still shot or as a frame extracted from IR video frames in the event the IR sensor 20 is operable to obtain IR video frames. In this simplified illustration, the IR data frame 120 includes some number of pixels in the range of, for example, (0,0) to (m,n). While only one hundred and forty-four pixels are illustrated, it should be understood that depending upon the complexity and capabilities of the IR sensor 20, the number of pixels may number significantly more than one hundred and forty-four pixels. Depending upon the size of the IR data frame 120, some of the additional elements in the background 30 shown in FIG. 1, such as a portion of the picture 40 and a portion of the window 45, may be captured. For every pixel there is an associated IR signal or gray value S(x,y) where x and y represent the coordinates of a given pixel and thus range from (0,0) to (m,n). Thus, for pixel (0,0) there is an IR signal S(0,0), for pixel (3,4) there is an IR signal S(3,4) and so on for up to pixel (m,n) where the IR signal is S(m,n).

The facial recognition code 60 depicted in FIG. 4 and described above, is configured to use the unique heat signature of the face 17 of the user 15 for face recognition. The facial recognition code 60 processes the IR data frame 120 to segment the face 17 of the user 15 from the background 30. Initially and via the facial recognition algorithm, every pixel is labeled as either user or background. The facial recognition algorithm can use well-known Bayesian techniques or other techniques. Because the outline of the user 15 can be variable from user to user or from day to day, the pixels associated with not only the face 17 of the user 15 but also the periphery of the user 15 may be subtracted out in order to achieve an Ambient Temperature calculation. Thus, pixels that border the face 17, such as pixels (3,4), (4,8) and (8,4), etc. and the pixels within the face 17 may be labeled as "face" pixels. The dashed box 122 shows the delineation of these "face" or "user" pixels from the pixels of the background 30. The segmentation process segments the IR data frame or image 120 into user image data and background image data. Unlike conventional systems, which discard the portion of the IR data frame 120 associated with the background 30, i.e., the background image data, the ambient temperature computation code 65 takes the background portion of the IR data frame 120 and computes therefrom the Ambient Temperature.

Figure 7:
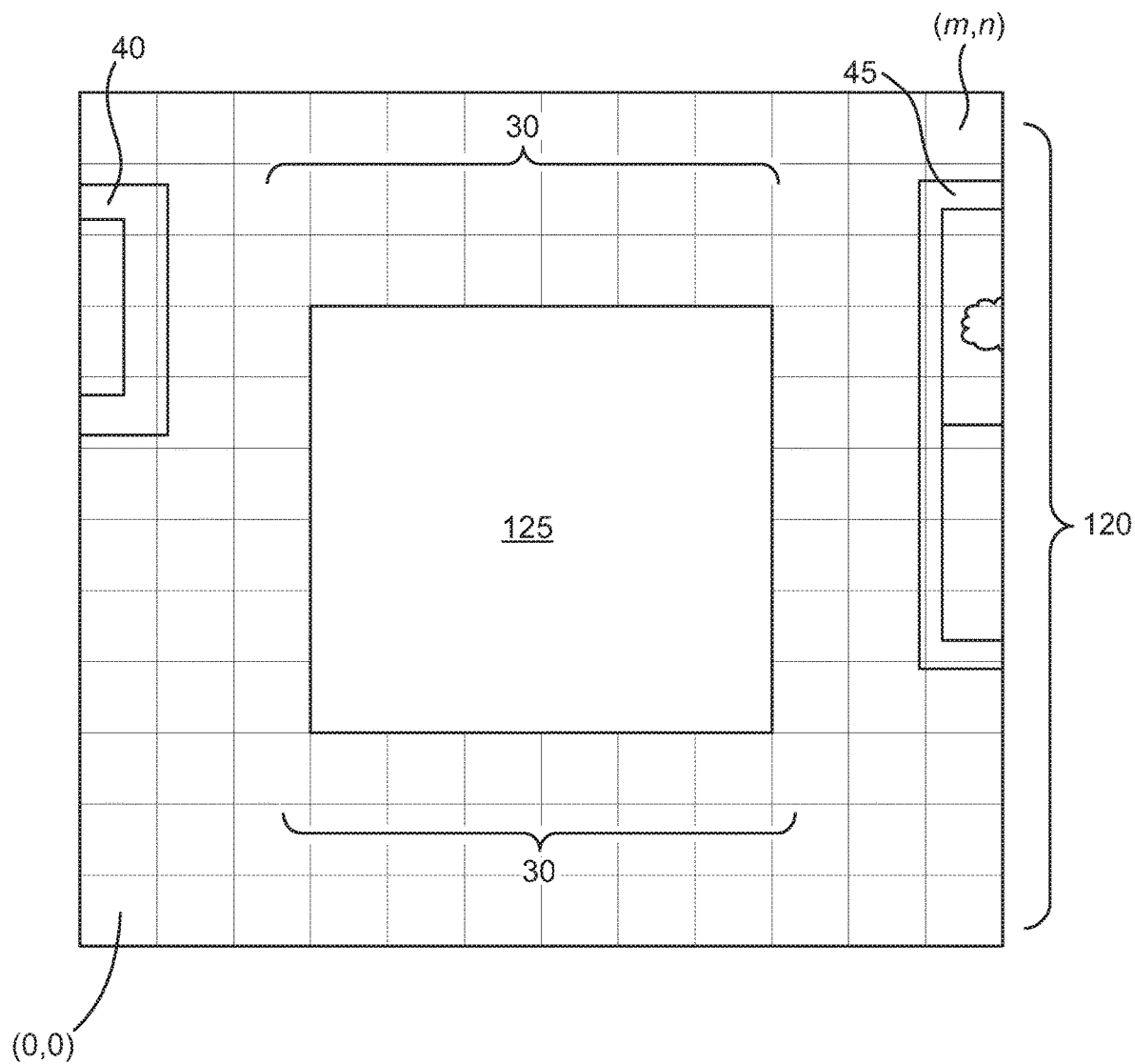
FIG. 7 is a depiction of the exemplary IR data frame with user IR image data segmented out.

Referring now also to FIG. 7, the ambient temperature code 65 subtracts out the user image data pixels (the dashed box 122 in FIG. 6) from IR data frame 120 to leave the IR pixel data for only the background 30, the background image data. The white square 125 represents the subtracted out IR "user" pixels (delineated by the dashed box 122 in FIG. 6) associated with the user 15 shown in FIG. 6. With the user image data 125 subtracted out, the remaining IR pixel data for the background 30, the background image data, may be used to calculate an Ambient Temperature using well-known algorithms and techniques. Various background elements, such as the picture 40 and the window 45, may distort the calculation of ambient temperature from the IR pixel data for the background 30. For example, the window 45 may be much hotter than the wall 35 or other parts of the background 30 due to intense sun exposure or other factors. Therefore the temperature computation code 65 can look for such distorting features in the background 30 and subtract those out as necessary so that the calculation of Ambient Temperature more accurately reflects the actual temperature of the background 30. Other examples of items that might distort the background temperature, and thus the Ambient Temperature, calculation might be for example a kitchen oven, a clothes dryer, a heating furnace or some other heat source or something that is relatively colder than the surrounding ambient, such as a cold storage locker or window-mounted air conditioner.

Figure 8:
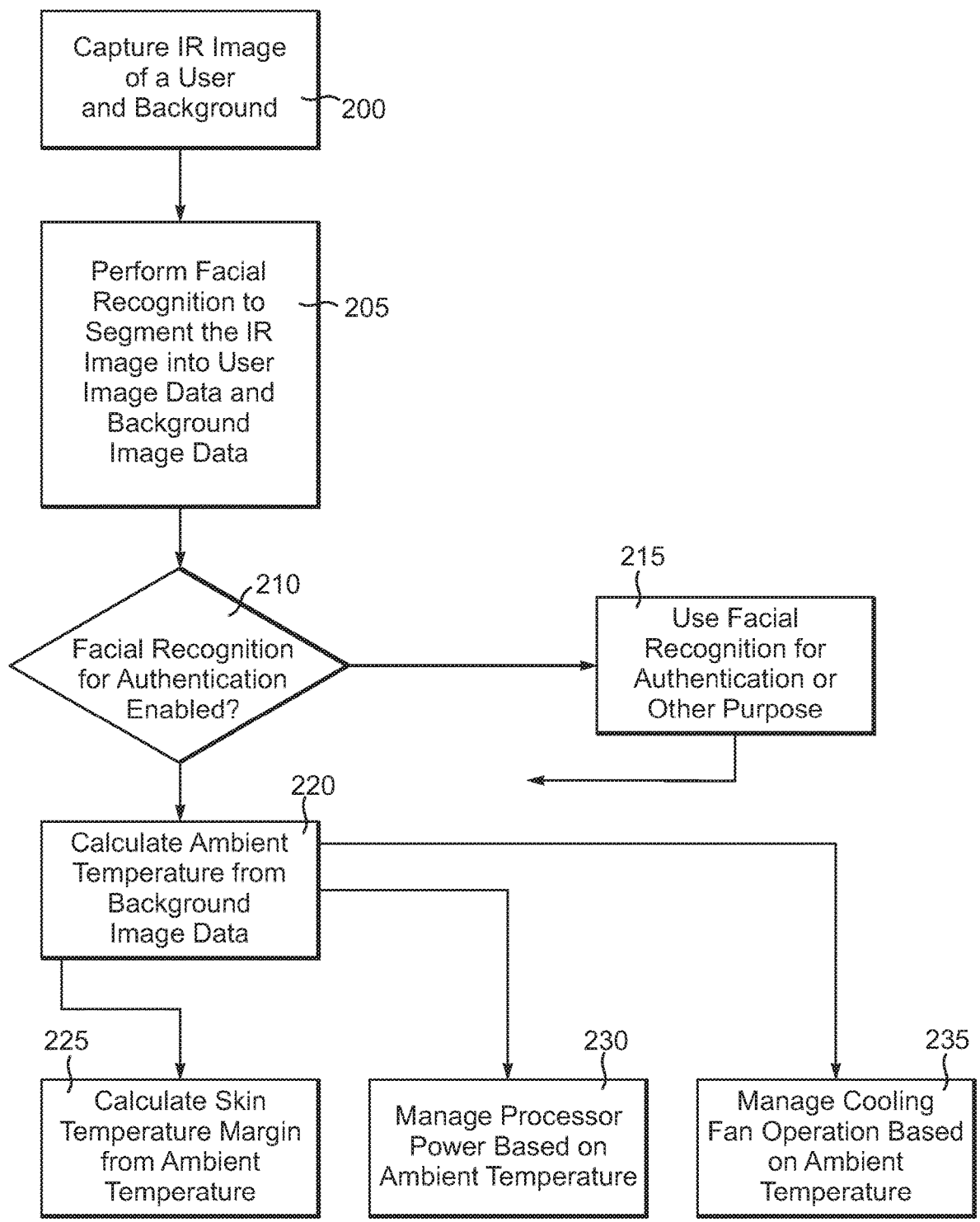
FIG. 8 is an exemplary flow chart for facial recognition, ambient temperature determination and control based thereon.

An exemplary process flow for operating the computing device 10 shown in FIGS. 1 and 2 can be understood by referring now to FIG. 8, which is a flow chart. At step 200, an IR image of a user and a background is captured. This can be by the IR sensor 20 of the computing device depicted in FIGS. 1 and 2 for example and can yield the IR data frame 120 depicted in FIGS. 6 and 7. At step 205, facial recognition is performed to segment the IR image (such as the IR data frame 120) into user image data and background image data. At step 210, if facial recognition for authentication is enabled, then at step 215 facial recognition is used for authentication or other purposes. For example, the facial recognition can be used to authenticate the user 15 to the computing device 10, or to the operating system 55 or to an application running on the computing device, such as APP1, APP2 etc. From step 215 can optionally proceed to step 220. If, however, at step 210, facial recognition for authentication is not enabled, then the process proceeds to step 220 and calculation of Ambient Temperature from the background image data. The calculated Ambient Temperature can be used to control one or more aspects of the computing device 10, such as one or more aspects of the processor 70 (clock speed and/or voltage) and/or one or more aspects of thermal systems, such as fan speeds and on/off intervals. For example, the calculated Ambient Temperature can be used at step 225 to calculate Skin Temperature Margin, at step 230 to manage processor power and at step 235 to manage cooling fan operation as described elsewhere herein. Steps 225, 230 and 235 can be performed serially or concurrently. Furthermore, any or all of steps 225, 230 and 235 can be performed. It should be understood that the computing device 10 could periodically return to step 200 and take a fresh image to recalculate Ambient Temperature. Optionally, the user 15 could make the computing device 10 return to step 200. This might be appropriate if the user 15 changes from the location 13 shown in FIG. 1 to some other location or believes that the ambient conditions have changed such that recalculation is appropriate.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of computing, comprising:
taking an IR image of a user and a background with an IR sensor of a computing device, the computing device being in a location;
segmenting the IR image into user image data and background image data;
detecting one or more ambient temperature distorting features in the background image data;
determining an ambient temperature of the location using the background image data, wherein determining the ambient temperature includes removing the one or more ambient temperature distorting features from the background image data; and
controlling an aspect of the computing device based on the ambient temperature and a calculated skin temperature margin, wherein the calculated skin temperature margin is based on a difference between a maximum allowable computing device external temperature for user skin contact with the computing device and a current computing device external temperature.

2. The method of claim 1, wherein the segmenting comprises performing facial recognition on the IR image.

3. The method of claim 2, comprising using the facial recognition to authenticate the user to the computing device.

4. The method of claim 2, comprising using the facial recognition to authenticate the user to an application running on the computing device.

5. The method of claim 1, wherein controlling an aspect of the computing device based on the determined ambient temperature includes:
controlling thermal management of the computing device.

6. The method of claim 5, wherein the computing device comprises a processor and a cooling fan; and
wherein controlling thermal management of the computing device includes controlling at least one of processor power and fan movement.

7. A method of controlling a component of a computing device, comprising:
taking an IR image of a user and a background with an IR sensor of a computing device, the computing device being in a location;
segmenting the IR image into user image data and background image data;
detecting one or more ambient temperature distorting features in the background image data;
determining an ambient temperature of the location using the background image data, wherein determining the ambient temperature includes removing the one or more ambient temperature distorting features from the background image data; and
controlling an aspect of the component based on the ambient temperature and a calculated skin temperature margin, wherein the skin temperature margin is based on a difference between a maximum allowable computing device external temperature for user skin contact with the computing device and a current computing device external temperature.

8. The method of claim 7, wherein the segmenting comprises performing facial recognition on the IR image.

9. The method of claim 8, comprising using the facial recognition to authenticate the user to the computing device.

10. The method of claim 8, comprising using the facial recognition to authenticate the user to an application running on the computing device.

11. The method of claim 7, wherein the component comprises a processor and the controlled aspect comprises clock speed.

12. The method of claim 7, wherein the component comprises a cooling fan and the controlled aspect comprises fan movements.

13. The method of claim 7, wherein the component comprises a processor and the controlled aspect comprises core voltage.

14. A computing device, comprising:
an IR sensor configured to take an IR image of a user and a background, the computing device being in a location; and
a processor programmed to:
segment the IR image into user image data and background image data;
detect one or more ambient temperature distorting features in the background image data;
determine an ambient temperature of the location using the background image data, wherein determining the ambient temperature includes removing the one or more ambient temperature distorting features from the background image data; and
control an aspect of the computing device based on the ambient temperature and a calculated skin temperature margin, wherein the calculated skin temperature margin is based on a difference between a maximum allowable computing device external temperature for user skin contact with the computing device and a current computing device external temperature.

15. The computing device of claim 14, wherein the segmenting comprises performing facial recognition on the IR image.

16. The computing device of claim 15, wherein the facial recognition is configured to authenticate the user to the computing device.

17. The computing device of claim 15, wherein the facial recognition is configured to authenticate the user to an application running on the computing device.

18. The computing device of claim 14, further comprising: determining a temperature margin based on a difference between a preselected maximum external temperature of the computing device and a current external temperature of the computing device, wherein the controlling an aspect of the computing device is further based on the temperature margin;
wherein controlling an aspect of the computing device based on the ambient temperature and the temperature margin includes:
comparing the ambient temperature to a first threshold and comparing the temperature margin to a second threshold.

19. The computing device of claim 18, wherein the computing device comprises a cooling fan and the controlled aspect comprises fan movement.

20. The computing device of claim 18, wherein the controlled aspect comprises processor clock speed or core voltage.

\* \* \* \* \*